(12) United States Patent
Lawler

(10) Patent No.: US 6,745,473 B2
(45) Date of Patent: Jun. 8, 2004

(54) CABLE SHEATHING SLITTER FOR A WIRE STRIPPER TOOL

(76) Inventor: Patrick F. Lawler, 600 W. River St., Milford, CT (US) 06460

( * ) Notice: Subject to any disclaimer, the term of this patent is extended or adjusted under 35 U.S.C. 154(b) by 20 days.

(21) Appl. No.: 10/197,778

(22) Filed: Jul. 18, 2002

(65) Prior Publication Data

US 2003/0014867 A1 Jan. 23, 2003

Related U.S. Application Data

(60) Provisional application No. 60/306,838, filed on Jul. 20, 2001.

(51) Int. Cl.$^7$ ............................. B25B 7/22; B21F 13/00
(52) U.S. Cl. ........................... 30/90.1; 30/90.6; 81/9.4
(58) Field of Search ................... 30/90.1, 90.4, 30/90.6, 90.7, 90.8, 91.1, 91.2; 81/9.4, 9.44

(56) References Cited

U.S. PATENT DOCUMENTS

| | | | |
|---|---|---|---|
| 778,388 A | 12/1904 | Warren | |
| 1,748,638 A | 2/1930 | Crum | 30/90.4 |
| 2,631,372 A | 3/1953 | Fournier | 30/320 |
| 3,902,206 A | * 9/1975 | Naquin | 30/90.6 X |
| 4,081,871 A | * 4/1978 | Knuth | 30/91.1 X |
| 4,246,808 A | * 1/1981 | Sandy et al. | 30/90.1 X |
| 4,485,696 A | * 12/1984 | Bieganski | 30/90.1 X |
| D299,692 S | 2/1989 | Steiner | D8/98 |
| 5,009,006 A | * 4/1991 | Sawyer et al. | 30/90.6 |
| 5,265,339 A | 11/1993 | Nilsson | 30/91.1 |
| 5,381,601 A | 1/1995 | Danter et al. | 30/90.1 |
| 5,398,413 A | 3/1995 | Chen | 30/90.1 |
| D359,214 S | 6/1995 | Carlson et al. | D8/51 |
| 5,539,983 A | 7/1996 | Reyburn et al. | 30/2 |
| 5,632,088 A | 5/1997 | Naso et al. | 30/91.2 |
| 5,732,471 A | * 3/1998 | Korinek et al. | 30/90.6 |
| D405,336 S | 2/1999 | Hepworth | D8/98 |
| 6,012,357 A | * 1/2000 | John | 81/944 |
| D430,474 S | 9/2000 | Lawler | D8/98 |
| 6,247,235 B1 | 6/2001 | Lawler | 30/90.4 |
| 6,418,817 B1 | * 7/2002 | Brown | 81/9.44 |
| 6,477,776 B1 | * 11/2002 | Jee | 30/90.1 |
| 6,510,611 B2 | * 1/2003 | Edwards et al. | 30/90.6 |

FOREIGN PATENT DOCUMENTS

DE      31543      5/1954      ............... 30/90.4

OTHER PUBLICATIONS

Two sheets of photographs illustrating prior art cable stripper.
Photographs of prior are wire stripper.

* cited by examiner

Primary Examiner—Charles Goodman
(74) Attorney, Agent, or Firm—Weingarten, Schurgin, Gagnebin & Lebovici LLP (57) ABSTRACT

A cable sheathing slitter attachment for a wire stripper tool. The cable sheathing slitter attachment is preferably integrally formed of sheet metal and a blade member and a guard member. The blade member includes a blade portion having first and second oppositely facing knife-edges and a mounting portion having an opening that facilitates the mounting of the blade member to a jaw of the wire slitter tool. The guard member includes a mounting portion with a hole therethrough and a U-shaped guard portion. A fastener passes through the hole in the mounting portion of the guard member, the elongated opening in the mounting portion of the blade member and through the hole in the respective jaw to mount the guard and blade members to the jaw of the wire stripper tool. The guard is rotatable with respect to the knife-edges to expose the knife-edges when it is desired to use the same for the slitting of non-metallic sheathed cables. In an alternative embodiment, the blade member is mounted within a recess within the jaw of a wire stripper tool and is movable between a first orientation is which knife edges are protected against inadvertent contact and a second orientation in which knife edges are exposed for use.

22 Claims, 8 Drawing Sheets

CABLE SHEATHING SLITTER FOR A WIRE STRIPPER TOOL

CROSS REFERENCE TO RELATED APPLICATIONS

The present application claims priority under 35 USC §119(e) of U.S. Provisional Application No. 60/306,838 titled Cable Sheathing Slitter Attachment for a Wire Stripper Tool filed Jul. 20, 2001.

STATEMENT REGARDING FEDERALLY SPONSORED RESEARCH OR DEVELOPMENT

Not Applicable

BACKGROUND OF THE INVENTION

The present invention relates to cutters used for slitting non-metallic sheathed cables.

Preparation of electrical cables for attachment to various connectors is a routine practice in the electrical trades. Cable preparation entails a number of operations. For example, when preparing a non-metallic sheathed cable, the cable must first be cut to a desired length. After the cable is cut to the desired length, the sheathing near the end of the cable must be slit to expose insulated electrical conductors within the cable, and the slit portion of the sheathing must be cut off. Subsequently, short lengths of insulation must be removed from the ends of the insulated conductors to expose the electrical conductors. Following the removal of the insulation at the ends of the insulated conductors, the electrical conductors are prepared for attachment via screw connections. Each electrical conductor is typically formed into a loop that is wrapped around a screw, and the screw is tightened to form a secure electrical connection. Because of the repetitive nature of the above-described tasks in the electrical trade, it is desirable to perform these tasks in a straightforward and efficient manner.

Figure 1:
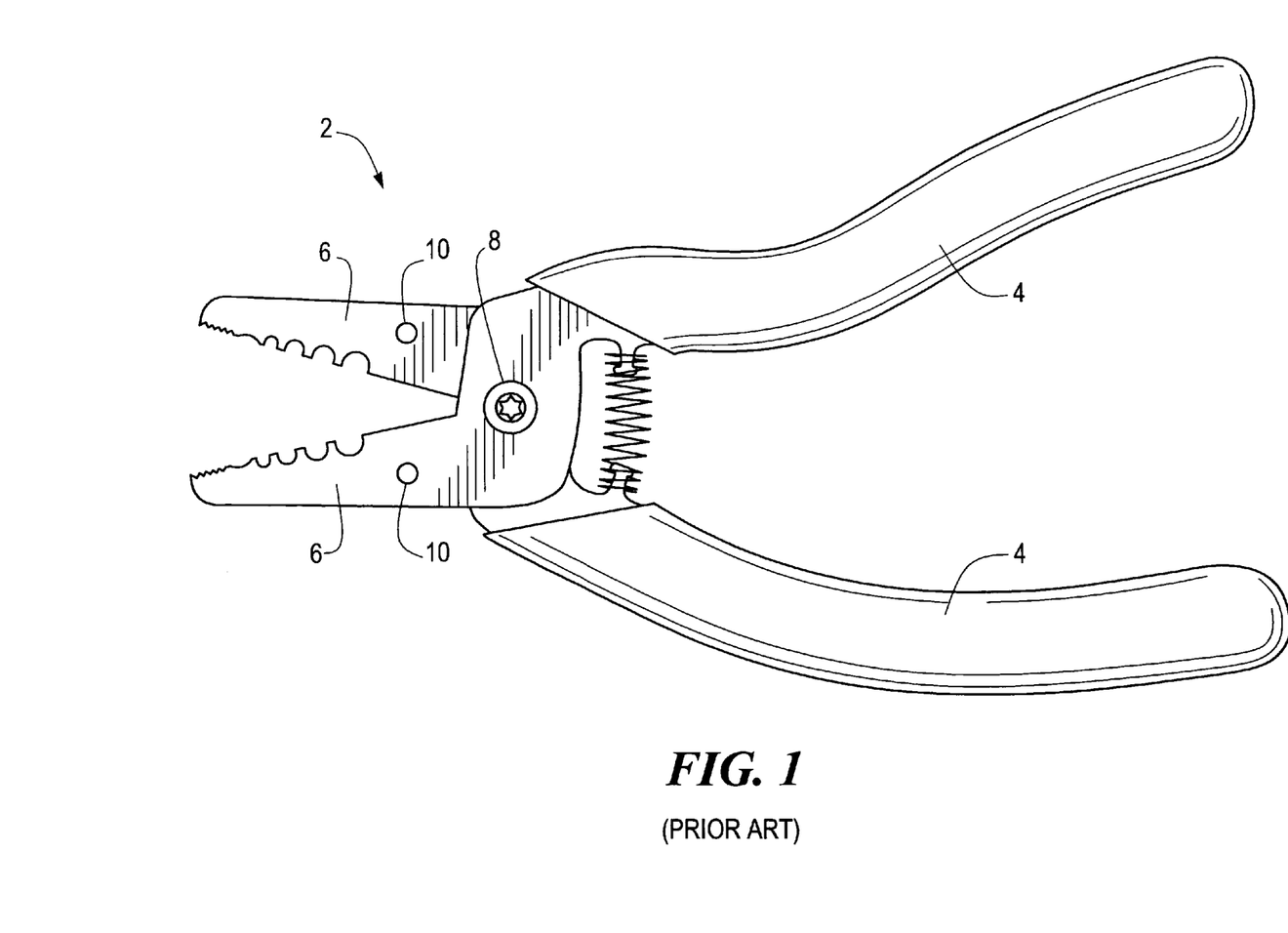
FIG. 1 is a side view of a prior art wire stripper tool.
Figure 2A:
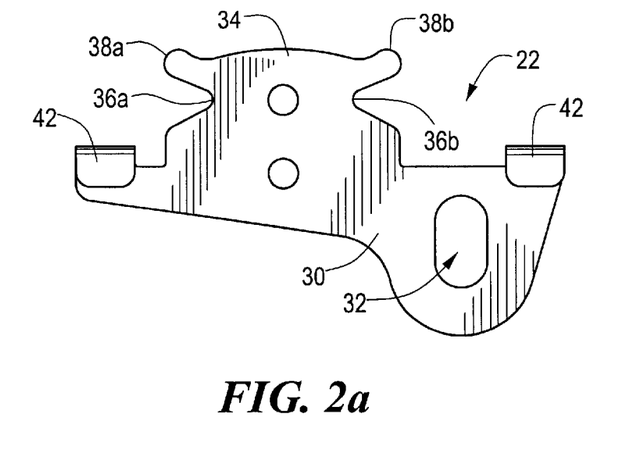
FIG. 2a is a side view of a first side of a blade member for a cable sheathing slitter attachment in accordance with the present invention.
Figure 2B:
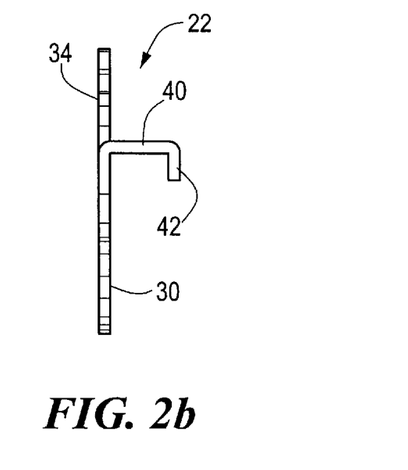

The most common tool employed in the electrical trades for the preparation of non-metallic sheathed cables is the wire stripper tool, which is available commercially from numerous vendors. One commercially available wire stripper tool is depicted in FIG. 1. While wire stripper tools differ in various minor aspects, each typically includes a pair of handles connected to offset jaw portions. The handles are pivotally attached so that squeezing the handles causes the jaw portions to close. One section of each jaw portion includes a blade for cutting non-metallic sheathed cables including insulated electrical conductors. Another section of the jaw portion is adapted for severing and removing insulation from various gauge insulated conductors. A third section of the jaw portion near the tips of the respective jaw portions is adapted for grabbing the conductors when the handles are squeezed together. As noted in FIG. 1, the commercially available wire stripper tool includes a hole that extends through at least one of the jaw portions. Once the insulation has been removed from the end of an insulated conductor, the exposed electrical conductor may be inserted through the hole in the jaw portion of the wire stripper tool and bent to form a loop at the end.

Existing wire stripper tools do not include any apparatus for slitting non-metallic sheathed cables. Accordingly, tradesman and others involved in cable preparation normally use another tool for this purpose. For example, a jack knife or a utility knife may be employed to slit a non-metallic sheathed cable. Additionally, the sheathing slitter and cutter tool disclosed in U.S. Pat. No. 6,247,235 that is owned by the owner of the present application may be used to slit a non-metallic sheathed cable. Because these tools are separate from the wire stripper tool, they may be misplaced. Moreover, because a separate tool is employed for slitting the sheathed cable, the operation is not as efficient as desired.

BRIEF SUMMARY OF THE INVENTION

A cable sheathing slitter attachment for a wire stripper tool is disclosed. In one embodiment the cable sheathing slitter attachment includes a blade member and a guard member that may be mounted to a wire stripper tool via use of a fastener. The blade member includes a mounting portion having at least one opening that is located so as to align with a hole in a jaw portion of the wire stripper tool when the blade member is disposed in a mounting position relative to the wire stripper tool. Additionally, the blade member includes a blade portion that is integrally formed with the mounting portion and that extends from the mounting portion of the blade member. The blade portion includes first and second knife edges, the first knife edge being oriented so as to face the front end of the wire stripper tool and the second knife edge being oriented so as to face the rear end of the wire stripper tool.

The guard member includes a mounting portion and a U-shaped blade guard portion that is integral with the mounting portion of the guard member. An opening is provided in the mounting portion of the guard member to permit pivotal mounting of the guard member with respect to the blade member. A fastener, such as a shoulder bolt is inserted through the opening in the mounting portion of the guard member, through the opening in the blade member and through the hole in the jaw portion of the wire stripper tool. A nut is threaded onto the bolt and tightened to secure the blade member in position with respect to the respective jaw of the wire stripper tool while allowing the guard member to pivot around the fastener with respect to the blade member. The first knife edge that faces the forward end of the wire stripper tool may be used for slitting non-metallic sheathed cable by urging the first knife edge forward and into the cable sheathing. The second knife edge that faces the rear end wire stripper tool may be used for slitting non-metallic sheathed cable by urging the tip of the second knife edge into the cable and pulling the wire stripper tool to slit the cable. The first and second knife-edges may be employed to slit the sheathing of non-metallic sheathed cables of virtually any size. The guard member is pivotally mounted with respect to the blade member and may be rotated into a first position in which the U-shaped portion of the guard member covers the knife-edges of the blade portion of blade member when the cable sheathing slitter attachment is not being used. When it is desired to slit non-metallic sheathed cables, the guard member may be pivotally rotated around the fastener into a second position in which the guard is clear of the knife edges.

In another embodiment of the invention, a blade member is pivotally mounted to or within a jaw of a wire stripper tool. In the second embodiment, the wire stripper tool is configured to provide a guard that is integrally formed as a part of a jaw of the wire stripper tool. The blade member may be rotated into a first position in which the knife-edges on the blade portion of the blade member are exposed for use. Additionally, the blade member may be rotated into a second position in which the knife-edges are oriented with respect to the jaw so as to prevent inadvertent contact with the knife-edges of the blade member.

Other features, aspects, and advantages of the present invention will be apparent from the Detailed Description of the Invention in conjunction with the drawing.

BRIEF DESCRIPTION OF THE SEVERAL VIEWS OF THE DRAWING

The present invention will be more fully understood by reference to the following Detailed Description of the Invention in conjunction with the Drawing of which:

FIG. 2b is an end view of the blade member of FIG. 2a;

FIG. 3b is an end view of the guard member depicted in FIG. 3a;

FIG. 4b is an end view of the shoulder bolt depicted in FIG. 4a;

FIG. 5a is a side view of a nut used in conjunction with the shoulder bolt depicted in FIG. 4a;

FIG. 5b is an end view of the nut depicted in FIG. 5a;

DETAILED DESCRIPTION OF THE INVENTION

U.S. Provisional Application No. 60/306,838 titled Cable Sheathing Slitter Attachment for a Wire Stripper Tool filed Jul. 20, 2001 is hereby incorporated by reference.

A cable sheathing slitter attachment for a wire stripper tool is disclosed. In one embodiment of the invention, the cable sheathing slitter attachment may be fabricated as an add-on that may be mounted to commercially available wire stripper tools. In another embodiment, the wire stripper tools has a jaw that is configured to incorporate a wire sheathing slitter attachment within a slot formed within the jaw. In another embodiment, the wire stripper tool has a jaw that is configured to incorporate a wire sheathing slitter attachment within a recess formed on a side of the jaw. In another embodiment, the wire stripper tool has the wire sheathing slitter attachment that is formed as an integral part of the wire stripper tool jaw.

A wire stripper tool 2 that is known in the art is depicted in FIG. 1. The wire stripper tool 2 includes handles 4 and jaws 6 that are cross-coupled. The cross-coupled handles 4 and jaws 6 pivot around a fastener 8 so that the jaws 6 of the wire stripper tool 2 close when the handles 4 are squeezed together. Commercially available wire stripper tools typically have holes 10 provided in the jaws 6 that may be used to bend electrical conductors. In a first embodiment of the invention one of the holes 10 is employed for mounting the cable sheathing slitter attachment to the wire stripper tool 2.

A cable sheathing slitter attachment in accordance with the present invention is depicted in FIGS. 1–6. The cable sheathing slitter attachment includes a blade member 22 and a guard member 24. The blade member 22 includes a mounting portion 30 having an elongated opening 32 and a blade portion 34 having first and second knife edges 36a and 36b respectively. The opening 32 is elongated to allow for the mounting of the blade member 22 to a number of commercially available wire stripper tools which may have different distances between the edge of the respective jaw and the center of the hole 10 within the respective jaw. The first knife edge 36a generally faces the front of the wire stripper tool when the blade member 22 is mounted to the tool 2 and the second knife edge 36a generally faces the rear of the tool 2 when the blade member 22 is mounted to the tool 2. The blade portion 34 has knife edge tips 38a, 38b adjacent the respective knife edges 36a, 36b. One of the tips 38a, 38b is used to puncture a non-metallic sheathed cable prior to the slitting of the cable using the corresponding knife-edge 36a, 36b. Stabilizing flanges 40 are integrally formed with the mounting portion 30 of the blade member 22. The stabilizing flanges 40 extend from the mounting portion 30 at an angle of approximately 90° from a plane formed by the mounting portion 30 and the blade portion 34 of the blade member 22. The flanges 40 abut the edge of one of the jaws 6 of the wire stripper tool 2 when the blade member 22 is mounted to the wire stripper tool 2 to prevent rotational movement of the blade member 22 with respect to the tool 2. As illustrated, the flanges 40 have end portions 42 that are bent at approximately 90° with respect to the flanges 40. The end portions 42 wrap around the jaw 6 to further stabilize the blade member 22 against undesired twisting when the cable sheathing slitter attachment is being used for slitting the sheathing of non-metallic sheathed cables.

Figure 3A:
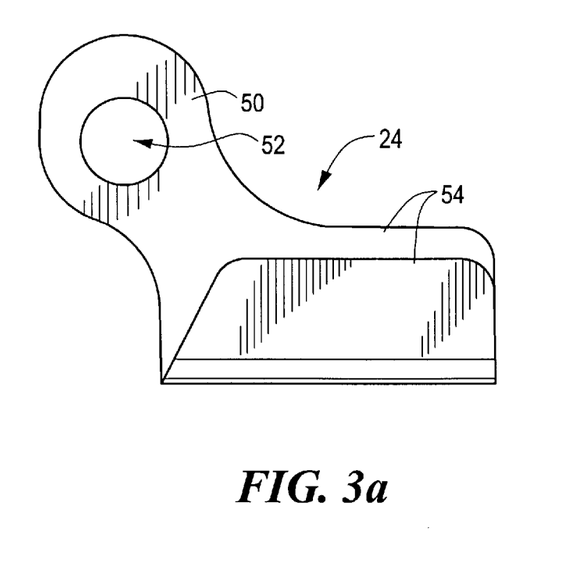
FIG. 3a is a side view of a first side of a guard member for use in conjunction with the blade member of FIG. 2a in a cable sheathing slitter attachment.
Figure 3B:
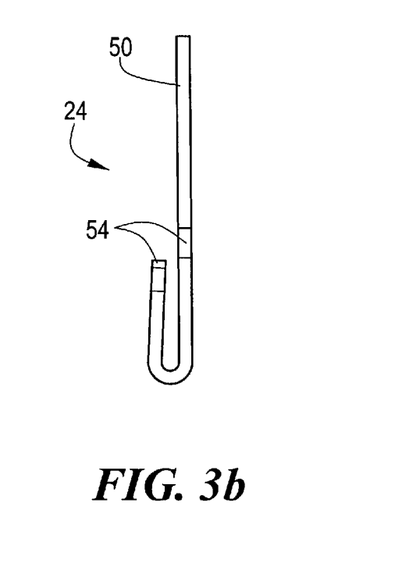
Figure 4A:
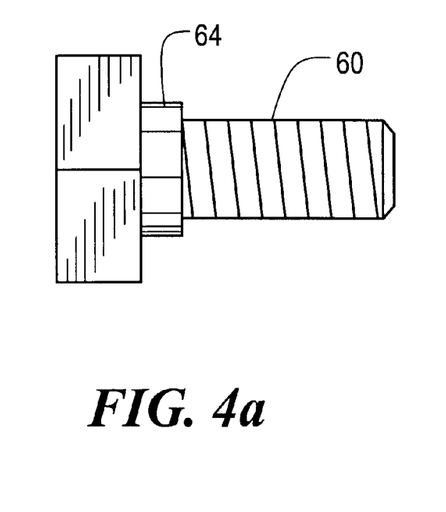
FIG. 4a is a side view of a shoulder bolt used to mount the blade member and guard member to a wire stripper tool.
Figure 4B:
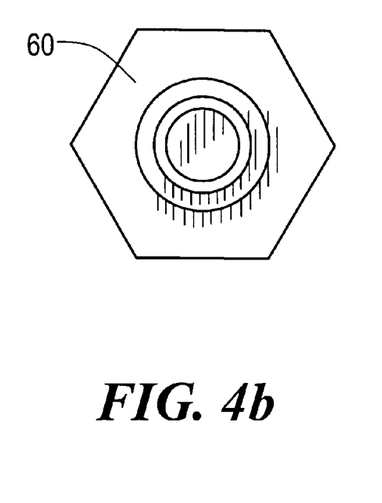
Figure 5A:
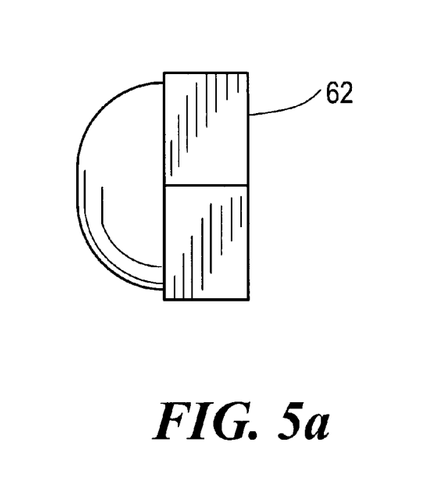
Figure 5B:
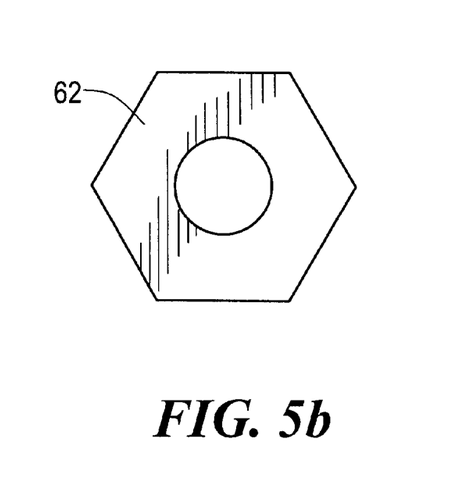

The guard member 24 includes a mounting portion 50 having a hole 52 provided therein. Additionally, the guard member 24 includes a U shaped guard portion 54 that is integral with the mounting portion 50.

Figure 6:
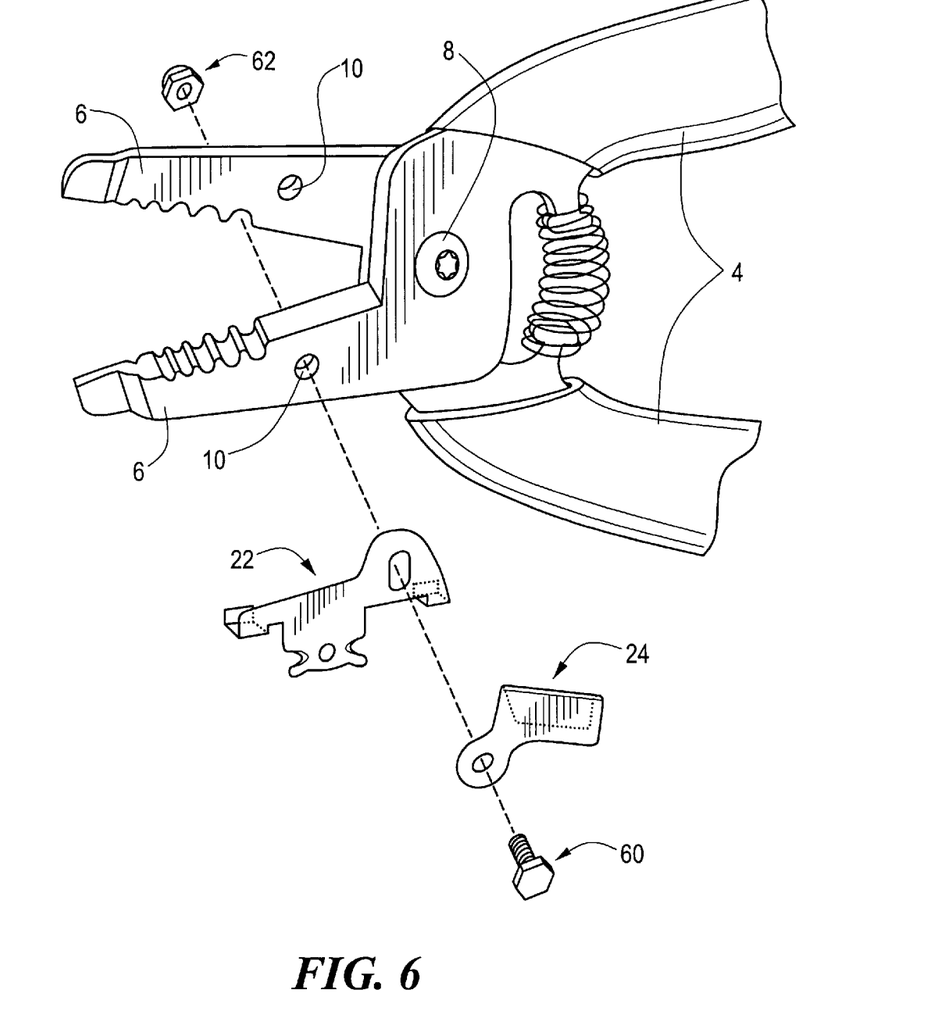
FIG. 6 is an exploded perspective assembly view depicting the mounting of the blade member and the guard member to a wire stripper tool.

The blade member 22 and the guard member 24 are mounted to one of the jaws 6 of the wire stripper tool 2 via use of a fastener, such as a shoulder bolt 60 and a nut 62. More specifically as depicted in FIG. 6, to mount the blade member 22 and the guard member 24 to one of the jaws 6 of the wire stripper tool 2, the blade member 22 is positioned in a mounting position with respect to the jaw 6 with the elongated opening 32 of the blade member 22 aligned with the hole 10 in the jaw 6 such that the stabilizing flanges 40 are generally abutting the edge of the respective jaw 6. The guard member 24 is then disposed over the blade member 22 with the hole 52 in the mounting portion 50 of the guard member 24 aligned with the hole 10 in the jaw 6 to which the slitter attachment is to be mounted. The guard member 24 is oriented such that the U-shaped guard portion 54 covers the knife edges 36a, 36b when the guard portion 54 is rotated to a first position. The shoulder bolt 60 is passed through the hole 52 in the mounting portion 50 of the guard member 24, through the elongated opening 32 in the mounting portion 30 of the blade member 22 and through the hole 10 in the jaw to which the slitter attachment is to be mounted. The nut 62 is threaded onto the end of the shoulder bolt 60 to securely mount the blade member 22 and the guard member 24 to the jaw 6 of the wire stripper tool 2. Due to the presence of the shoulder 64, the guard member 24 is pivotally rotatable from the first position in which the U-shaped guard portion covers the knife edges 36a, 36b to a second position which exposes the knife edges 36a, 36b.

Figure 7:
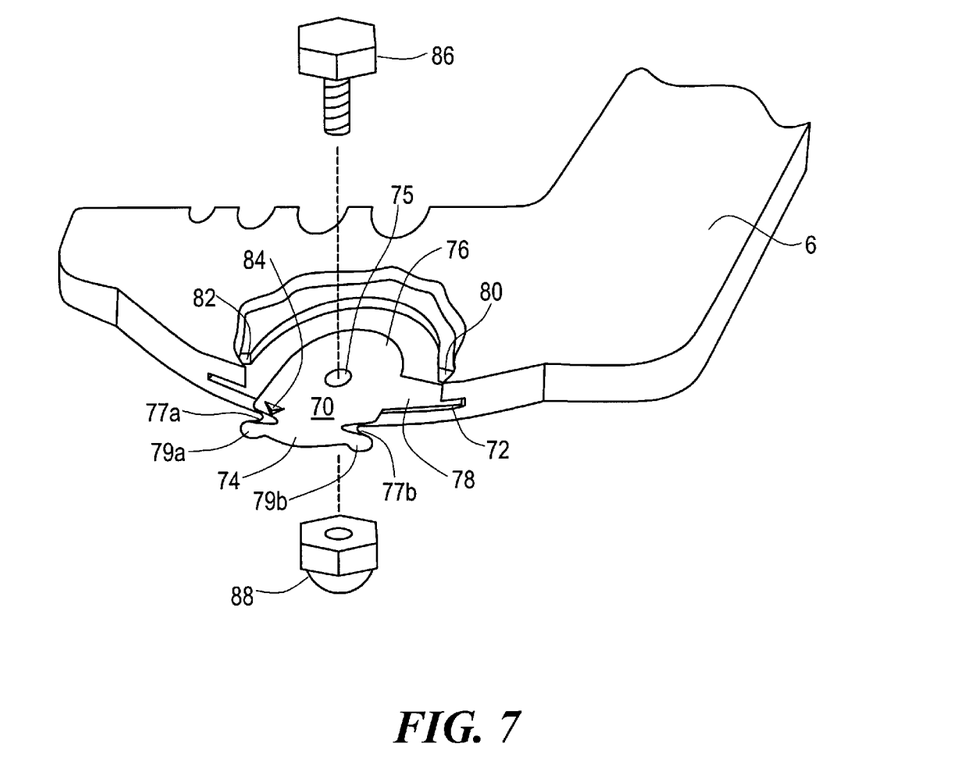
FIG. 7 is a perspective partial cutaway view depicting a cable sheathing slitter attachment mounted within a slot formed within a jaw of a wire stripper tool.

FIG. 7 depicts another embodiment in which a blade member 70 is disposed within a slot 72 milled or otherwise formed in the edge of the wire stripper tool 2. The blade member 70 includes a blade portion 74 and a mounting portion 76. The blade member 70 is mounted within the slot 72 via use of a fastener, such as a bolt 86 and a nut 88 so as to allow the blade member 70 to be pivotally rotatable within the slot around the bolt 86.

More specifically as depicted in FIG. 7, to mount the blade member 70 within the slot 72, the blade member 70 is positioned in a mounting position with respect to the jaw 6 with the opening 75 in the mounting portion 76 of the blade member 70 aligned with a hole (not shown) that extends through the respective jaw 6. The slot 72 is dimensioned to receive the blade member 70. The bolt 86 is passed through the hole in the jaw 6 above the blade member 70, through the opening 75 in the mounting portion 76 of the blade member 70, and through the hole in the jaw (not shown) below the blade member to pivotally capture the blade member 70 within the slot 72. The nut 88 is threaded onto the end of the bolt 86 to secure the blade member 70 within the slot 72.

The blade member 70 is pivotally rotatable from a first position in which the knife edges 77a, 77b are disposed within the slot 72, to a second position which exposes the knife edges 77a, 77b for use. The first position of the blade member 70 within the slot 72 is defined by the position of a stop tab 78 on the mounting portion 76 of the blade member 73 and a first stop 82 that limits rotational movement of the blade member 70. The stop tab 78 is configured and dimensioned to extend beyond the length of tips 79a and 79b. The length of the stop tab 78 is specified so as to engage the first stop 82 when rotated counterclockwise in the illustrated embodiment thereby stopping the rotation of the blade member 70 in the first position. Similarly, a second stop 80 is provided to engage the stop tab 78, but not the tips 79a, 79b. When the stop tab 78 engages the second stop 80, the blade member 70 is oriented in the second position.

A portion of the mounting portion 76 or a tab (not shown) extends outboard of the edge of the jaw 6 when the blade member 70 is disposed is the first position so as to permit a user to rotate the blade member from the first position to the second position.

In order to lock the blade member 70 in the second position, i.e., with the knife edges 77a, 77b exposed for use, a locking mechanism is provided that maintains the blade member 70 in the second position during use. Any suitable locking mechanism known in the art may be employed. For example, a locking tab 84 may be provided that extends from the surface of the mounting portion 76 of the blade member 70. When the blade member 70 is rotated to the second position, the locking tab springs upward in the illustrated embodiment preventing rotational movement of the blade member 70 toward the first position. The locking tab may be depressed slightly to disengage the locking tab 84 from the edge of the jaw and to allow the blade member 70 to be rotated to the first position. Alternatively a sliding member can be mounted to the jaw 6 that engages a cooperative locking surface on the blade member 70 to lock the blade member 70 in the second position. Moreover, a locking pin may be provided that extends through a hole in the jaw 6 (not shown) and a hole in the blade member 70 (not shown) to maintain the blade member 70 in the second position.

Figure 8:
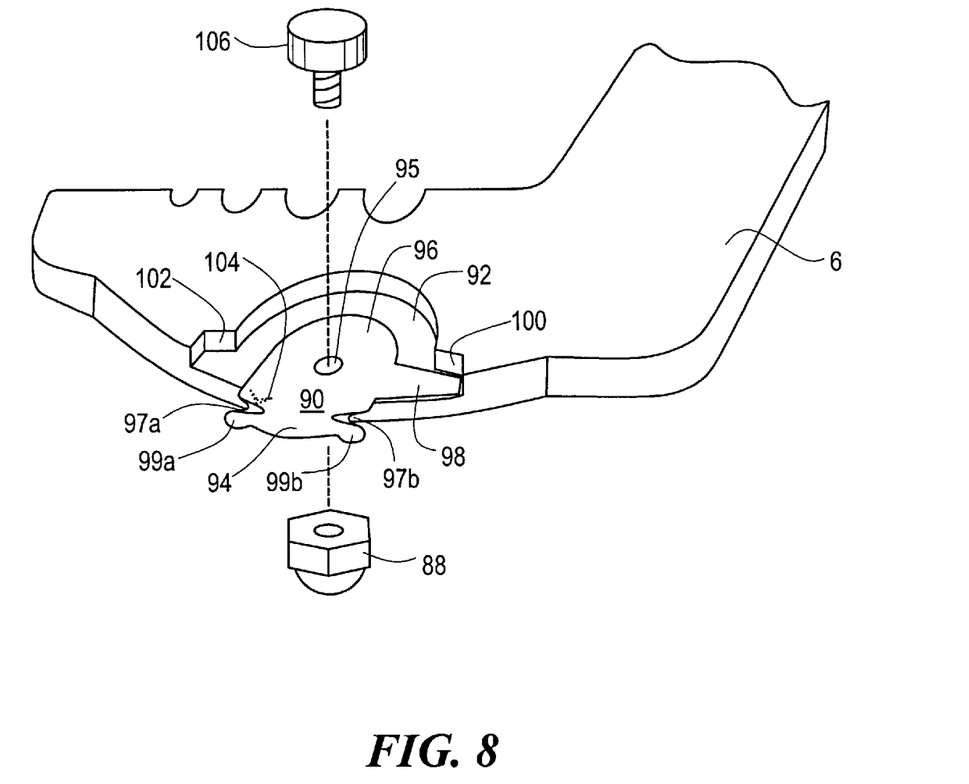
FIG. 8 is a perspective view depicting a cable sheathing slitter attachment mounted within a recess in a jaw of a wire stripper tool.

FIG. 8 depicts another embodiment in which a blade member 90 is disposed within a recess 92 that is milled or otherwise formed in the edge of the wire stripper. The blade member 90 includes a blade portion 94 and a mounting portion 96. The blade member 90 is mounted to the jaw 6 within the recess 92 via use of a fastener, such as a shoulder bolt 106 and a nut 108 such that the blade member 90 is pivotally rotatable about the shoulder bolt 106. More specifically to mount the blade member 90 within the recess 92, the blade member 90 is positioned in a mounting position in the recess 92 with the opening 95 in the mounting portion 96 of the blade member 90 aligned with a hole (not shown) in the jaw 6. The recess 92 is configured and dimensioned to receive the blade member 90 within the recess 92 when in a first position, i.e., when the blade member 90 is stored within the recess 92 and to permit rotation of the blade member 90 to a second position in which knife-edges 97a, 97a of a blade portion 94 of the blade member are exposed for use. The bolt 106 is passed through the hole 95 in the mounting portion 96 of the blade member 90 and through the hole (not visible) in the jaw 6 to which the blade member 90 is to be mounted. The nut 108 is threaded onto the end of the shoulder bolt 106 to securely mount the blade member 90 within the recess 92. The blade member 90 is thus pivotally rotatable from a first position in which the knife edges 97a, 97b are safely contained within the recess 92, to a second position in which the knife edges 97a, 97b are exposed for use. The first position of the blade member 90 within the recess 92 is defined by the position of a stop tab 98 on the mounting portion 96 of the blade member 90 and by a first stop 102. In the illustrated embodiment, the stop tab 98 is configured and dimensioned to extend beyond the length of tips 99a and 99b. This allows the first stop 102 to be located such that the tips 99a, 99b are able to pass the first stop 102 without engaging it as the blade member 90 is rotated within the recess 92. Similarly, a second stop 100 is configured and dimensioned to engage the stop tab 98, to limit rotational movement of the blade member 90 and to orient the blade member 90 in the second position, i.e., wherein the knife edges 97a, 97b are exposed for use when the stop tab abuts the second stop 100.

A portion of the mounting portion 96 or a tab (not shown) may extend outboard of the edge of the jaw 6 when the blade member 90 is disposed is the first position so as to permit a user to rotate the blade member from the first position to the second position.

As discussed above in connection with FIG. 7, a locking mechanism may be provided to releasably fix the blade member 90 in the second position for use in the slitting of non-metallic sheathed cables. By way of example, a stop tab 104 may be provided to releasably fix the blade member 90 in the second position.

Figure 9:
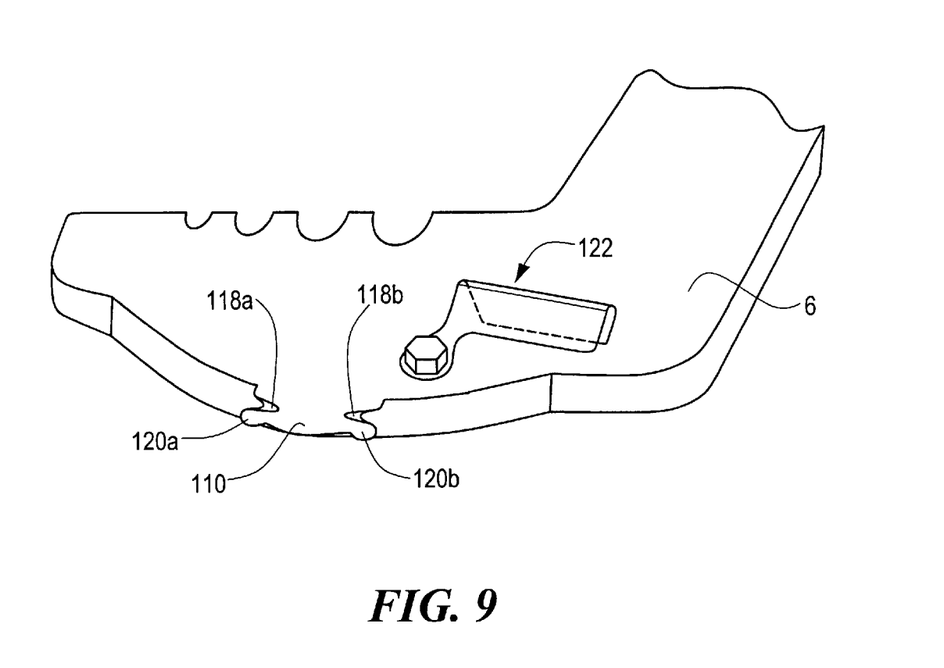
FIG. 9 is a perspective view depicting a cable sheathing slitter formed integral with the jaw of a wire stripper tool.

FIG. 9 depicts another embodiment in which a blade 110 is formed integral with or is mounted to the edge of the jaw 6 of a wire stripper tool. The blade member 110 includes first and second oppositely facing knife-edges 118a, 188b respectively. The first knife edge 118a generally faces the front or jaw end of the wire stripper tool and the second knife edge 118b generally faces the rear or handle end of the wire stripper tool. Tips 120a and 120b are provided adjacent the respective knife-edges 118a, 118b to facilitate the puncturing of the sheathed cable. A guard member 122 may be provided as discussed above to minimize the likelihood of inadvertent contact with the knife-edges 120a, 120b. The guard member 122 is repositionable between a first position in which the blade member is exposed for use and a second position in which the guard member 122 covers the blade member 110.

Figure 10:
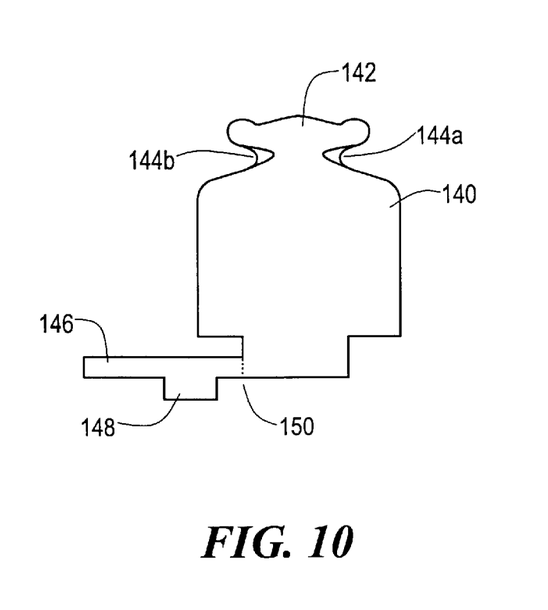
FIG. 10 is a top view of a blade member for use in another embodiment of the invention.
Figure 11:
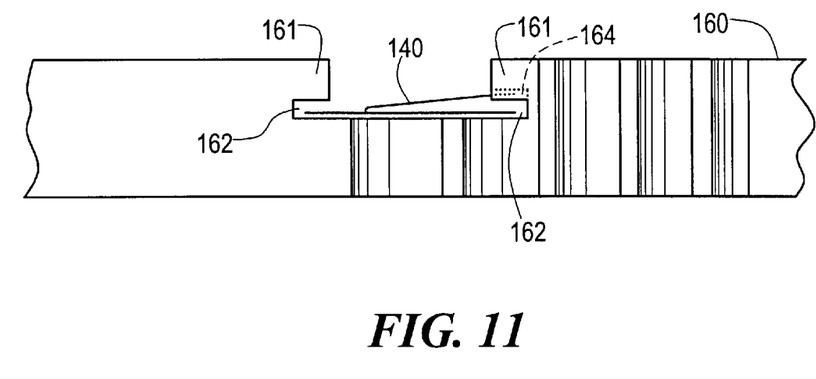
FIG. 11 is a side view of a portion of a jaw of a wire stripper tool having a recess adapted to retain the blade member depicted in FIG. 10.
Figure 12:
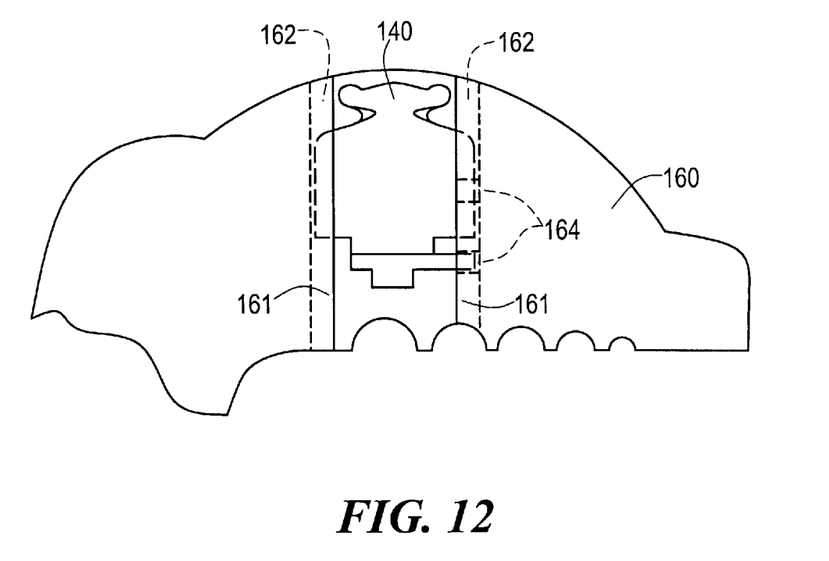
FIG. 12 is a top view of the jaw of FIG. 11 depicting the blade member installed in the recess within the jaw.

In another embodiment depicted in FIGS. 10–12, a blade member is slidably movable within a recess in a jaw between a first position in which knife edges are exposed for use and a second position in which the knife edges overlap the jaw so as to reduce the possibility of inadvertent contact with the knife-edges. More specifically, referring to FIG. 10, the blade member 140 includes a blade portion 142 having first and second knife-edges 144A and 144B respectively. Additionally, at the opposite end of the blade member 140 from the blade portion 142 a locking tab is provided that includes a detent engagement portion 146 and a push tab portion 148. The locking tab is bent along the dotted line 150 and over the bottom end of the blade member 140 so that the engagement portion 146 is urged upward away from the plane of the blade member 140. The blade member 140 is formed of a spring steel so that the engagement portion 146 and the push tab portion 148 may be deformed downward toward the plane of the blade member 140 and so the engagement portion 146 will return toward the normal undeformed position as a result of spring action. Referring to FIG. 11, the jaw 160 includes a recess with opposing sidewalls extending upward from the bottom surface of the recess. The jaw 160 further includes lips 161 that overhang the recess at the side edges of the recess so as to define slots 162 between the lips 161 and the bottom surface of the recess. The blade member 140 is of a width slightly less than the width between the sidewalls of the recess such that the blade member 140 may be disposed into the recess with the opposing edges of the blade member 140 being captively disposed within the slots 162 while permitting slidable movement of the blade member 140 within the recess. The engagement portion 146 of the locking tab is thus urged upward against the underside of one of the lips (the right hand lip as shown) as depicted in FIG. 11. Referring to FIG. 12, detents 164 are provided in the underside of one of the lips 161 such that the engagement portion 146 of the locking tab is urged upward into the respective detents 164 when the engagement portion 146 of the locking tab is aligned therewith to fixably locate the blade member 140 in one of several predetermined positions. In a first one of the predetermined positions the blade portion 142 is disposed outboard of the jaw 160 so that the knife edges 144A and 144B are exposed for use in the slitting of nonmetallic sheathed cables. When the blade member 140 is slidably moved within the recess such that the engagement portion 146 engages a second detent 164 the blade member is fixably located in a second position in which the blade member 140 confronts the jaw member 160 so as to minimize the possibility of inadvertent contact by a user with the knife edges 144A and 144B of the blade portion 142. To reposition the blade member 140 within the recess in the jaw 160, a user pushes against the push tab 148 to disengage the engagement portion 146 of the locking tab from one detent and slides the blade member 140 into another desired blade member 140 position in which the engagement portion 146 engages another detent 164.

It will be appreciated by those of ordinary skill in the art that modifications to and variations of the above-described cable sheathing slitter apparatus may be made without departing from the inventive concepts disclosed herein. Accordingly, the invention should not be viewed as limited except by the scope and spirit of the appended claims.

What is claimed is:

1. A cable sheathing slitter attachment for a wire stripper tool having opposing jaws and a hole through at least one of said jaws, said attachment comprising:
    a blade member having a mounting portion and an integral blade portion, said blade portion including first and second oppositely facing knife edges being positioned outboard of the respective jaw when said blade member is disposed in a mounting position with respect to said jaw.

2. The cable sheathing slitter attachment of claim 1 further including at least one stabilizing flange extending generally perpendicular to a plane passing through said blade portion and said mounting portion, said stabilizing flange operative to limit rotational movement of said blade member with respect to the respective jaw when said blade member is mounted to the jaw in said mounting position.

3. The cable sheathing slitter attachment of claim 1 wherein said mounting portion has an opening therethrough that is aligned with said hole in said at least one of said jaws when said blade member is disposed in said mounting position with respect to the respective jaw.

4. The cable sheathing slitter attachment of claim 3 further including:
    a guard member including a guard member mounting portion having a mounting hole therethrough and an integral guard member knife-edge cover portion, said guard member knife edge cover portion being rotatable between a first position in which said said cover portion is disposed adjacent said blade member to protect a user against inadvertent contact with said first and second knife-edges and a second position in which said first and second knife edges are exposed, said guard member being rotatable around a fastener passing through said hole in said guard member mounting portion and said hole in the respective jaw when said guard member is disposed in a guard member mounting position with respect to the respective jaw.

5. The cable sheathing slitter attachment of claim 4 wherein said guard member cover portion comprises a U-shaped guard member cover portion.

6. A combination wire stripper and sheathing slitter tool comprising:
    a wire stripper tool having first and second opposing handles and first and second opposing jaws, at least said first jaw having a hole extending therethrough, said wire stripper tool having a jaw end and a handle end;
    a blade member having a blade member mounting portion with an opening therethrough and an integral blade portion including at least one knife-edge, said at least one knife-edge disposed outboard of said first jaw when said blade member is disposed in a mounting position with respect to said first jaw;
    a guard member having a guard member mounting portion with an opening therethrough and an integral guard portion;
    a fastener passing through said opening in said guard member mounting portion, said opening in said blade member mounting portion and said hole in said first jaw, said fastener mounting said blade member so as to limit rotational movement of said blade member with respect to said first jaw, said fastener permitting rotational movement of said guard member around said fastener between a first position in which said guard portion of said guard member confronts said at least one knife-edge to prevent inadvertent contact of a user with said at least one knife edge and a second position in which said at least one knife edge is exposed for use.

7. The combination wire stripper and sheathing slitter tool of claim 6 wherein said at least one knife-edge comprises first and second knife-edges, said first and second knife-edges generally facing said jaw end and said handle end of said tool respectively.

8. The combination wire stripper and sheathing slitter tool of claim 6 wherein said opening in said mounting portion of said blade member comprises an elongated slot.

9. The combination wire stripper and sheathing slitter tool of claim 6 wherein said fastener comprises a shoulder bolt and a nut.

10. The combination wire stripper and sheathing slitter tool of claim 5 wherein said guard member guard portion comprises a U shaped guard portion.

11. The combination wire stripper and sheathing slitter tool of claim 5 wherein said blade member includes at least one flange extending generally perpendicular to a plane formed by said blade member mounting portion, said first jaw having an outer edge, said at least one flange abutting said outer edge of said first jaw when said blade member is disposed in said mounting position with respect to said first jaw so as to prevent rotational movement of said blade member with respect to said first jaw.

12. The combination wire stripper and sheathing slitter tool of claim 11 wherein said at least one flange comprises first and second flanges located at opposite ends of said mounting portion of said blade member.

13. A combination wire stripper and sheathing slitter tool comprising:
 a wire stripper tool having first and second opposing handles and first and second opposing jaws; and
 a blade member having at least one knife edge, said blade member being movably coupled to said first jaw such that said blade member is selectively positionable in first and second orientiations with respect to said first jaw,
 said at least one knife edge of said blade member being disposed outboard of said first jaw when said blade member is disposed in said first orientation and said at least one knife edge being disposed in confronting relation with said jaw when said blade member is disposed in said second orientation.

14. The combination wire stripper and sheathing slitter tool of claim 13 wherein said first jaw includes a hole extending therethrough and said blade member has an opening therethrough,
 said tool further including a fastener extending through said hole in said jaw and said opening in said blade member so as to permit pivotal rotation of said blade member between said first and second orientation.

15. The combination wire stripper and sheathing slitter tool of claim 14 wherein said first jaw includes a recess and said blade member is pivotally rotatable within said recess.

16. The combination wire stripper and sheathing slitter tool of claim 15 wherein said at least one knife-edge comprises first and second knife-edges, said first and second knife-edges generally facing said jaw end and said handle end respectively.

17. The combination wire stripper and sheathing slitter tool of claim 13, wherein said first jaw has an inner edge and an opposing outer edge, said tool having a recess in said jaw extending generally between said first edge and said second edge, said blade blade member being slidably mounted within said recess such that that blade member is slidably movable between said first orientation and said second orientation.

18. The combination wire stripper and sheathing slitter tool of claim 17 wherein said first jaw has a top surface and said recess has a bottom surface and opposing sidewalls having a first width therebetween, said sidewalls extending from said recess bottom surface toward said jaw top surface, said first jaw including first and second lips overhanging said recess so as to form opposing slots beneath said lips, said blade member having opposing edges and a second width between the opposing edges slightly less than said first width, said blade member being mounted within said recess with opposing edges of said blade member being disposed within said slots such that said blade member is captively slidable within said recess between said first and second orientations.

19. The combination wire stripper and sheathing slitter tool of claim 18 wherein one of said said lips includes first and second detents, said blade member having a resilient tab member that is urged upward against said one of said lips so as to engage said first and second detents when aligned therewith respectively, said blade member being disposed in said first orientation when said tab member engages said first detent and said blade member being disposed in said second orientation when said tab member engages said second detent.

20. The combination wire stripper and sheathing slitter tool of claim 19 wherein said at least one knife-edge comprises first and second knife-edges.

21. A combination wire stripper and sheathing slitter tool comprising:
 a wire stripper tool having first and second opposing handles and first and second opposing jaws, said wire stripper tool having a jaw end and a handle end;
 a blade member having first and second oppositely facing knife-edges, said blade member extending from said first jaw of said wire stripper tool, such that said first and second knife-edges are disposed outboard of said first jaw, said first and second knife-edges generally facing said jaw end and said handle end respectively.

22. The combination wire stripper and sheathing slitter tool of claim 21 further comprising:
 a guard member, said guard member being repositionable between a first position in which is guard member covers said at least one knife edge and a second position in which said at least one knife edge is exposed for use.

* * * * *